United States Patent [19]

Akahane

[11] Patent Number: 5,301,132

[45] Date of Patent: Apr. 5, 1994

[54] ASSEMBLY STRUCTURE FOR INFORMATION INPUTTING APPARATUS

[75] Inventor: Ryosuke Akahane, Kanagawa, Japan

[73] Assignee: Sony Corporation, Tokyo, Japan

[21] Appl. No.: 917,237

[22] Filed: Jul. 23, 1992

[30] Foreign Application Priority Data

Jul. 23, 1991 [JP] Japan .............................. 3-057006[U]

[51] Int. Cl.$^5$ .......................... G06F 1/00; H05K 7/20
[52] U.S. Cl. .................................. 364/708.1; 361/681
[58] Field of Search ................ 364/708; 361/392, 393, 361/394, 395, 396

[56] References Cited

U.S. PATENT DOCUMENTS

| | | | |
|---|---|---|---|
| 4,905,173 | 2/1990 | Bianco ................................ | 364/708 |
| 5,030,128 | 7/1991 | Herron et al. ....................... | 364/708 |
| 5,237,486 | 8/1993 | La Pointe et al. .................. | 361/728 |

Primary Examiner—Long T. Nguyen
Attorney, Agent, or Firm—Hill, Steadman & Simpson

[57] ABSTRACT

Assembly structure for an information inputting apparatus is disclosed which comprises an upper cabinet 1, a lower cabinet 2, a keyboard 3 having a plurality of keys arranged thereon, and a cover 5 on which a liquid crystal display 4 is mounted. The upper cabinet has tab portions provided thereon for contacting with a lower face of the keyboard to effect positioning and holding of the keyboard, the lower cabinet has a fitting hole or-/and a fitting recessed portion for the keyboard provided at an end thereof and has a first mounting hole 2b provided at the other end thereof for placing the keyboard thereon, the keyboard has a fitting convex portion 3a provided at an end thereof for fitting with the fitting hole or/and fitting recessed portion of the lower cabinet and has a second mounting hole 3b provided at the other end thereof and held between the lower cabinet and the cover, and the cover has a female screw 5a provided therein into which a male screw 6 is fixed by way of the first mounting hole of the lower cabinet and the second mounting hole of the keyboard.

3 Claims, 3 Drawing Sheets

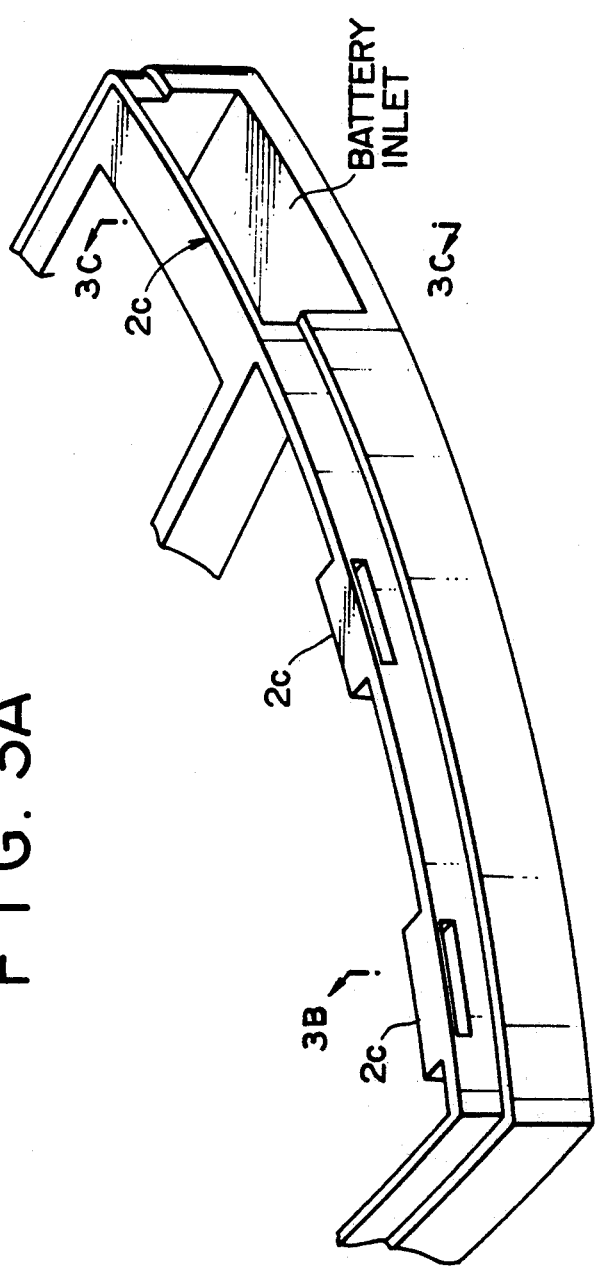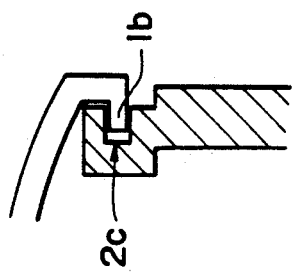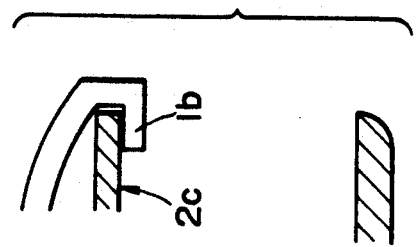

ASSEMBLY STRUCTURE FOR INFORMATION INPUTTING APPARATUS

BACKGROUND OF THE INVENTION

The present invention relates to an information inputting apparatus, and more particularly to an assembly structure for the information inputting apparatus.

A conventional information inputting apparatus has such a structure that a keyboard is incorporated in either one of an upper cabinet and a lower cabinet and requires coupling between the upper cabinet and the lower cabinet separately from fixation of the keyboard. Consequently, it has problems that assembly of the entire unit is complicated, that also the number of screws used likely becomes great, and that it is disadvantageous in service feasibility and designing.

OBJECT AND SUMMARY OF THE INVENTION

It is an object of the present invention to provide an information inputting apparatus which is improved in service feasibility and is also improved in appearance by decreasing the number of screws required to fix an upper cabinet to a lower cabinet.

According to the present invention, an information inputting apparatus which includes an upper cabinet, a lower cabinet, a keyboard having a plurality of keys arranged thereon, and a cover. The upper cabinet has a tab portion provided thereon for contacting with a lower face of the keyboard to effect positioning and holding of the keyboard. The lower cabinet has a fitting hole or/and a fitting recessed portion for the keyboard provided at an end thereof and has a first mounting hole provided at the other end thereof for placing the keyboard thereon. The keyboard has a fitting projected portion provided at an end thereof for fitting with the fitting hole or/and fitting recessed portion of the lower cabinet and has a second mounting hole provided at the other end thereof and held between the lower cabinet and the cover, and the cover has a female screw provided therein into which a male screw is fixed by way of the first mounting hole of the lower cabinet and the second mounting hole of the keyboard. With such construction, the number of screws can be reduced.

BRIEF DESCRIPTION OF THE DRAWINGS

FIGS. 3A, 3B and 3C are illustrated to show the detail of the engagement between first catching portions and second catching portions.

DESCRIPTION OF THE PREFERRED EMBODIMENTS

Figure 1:
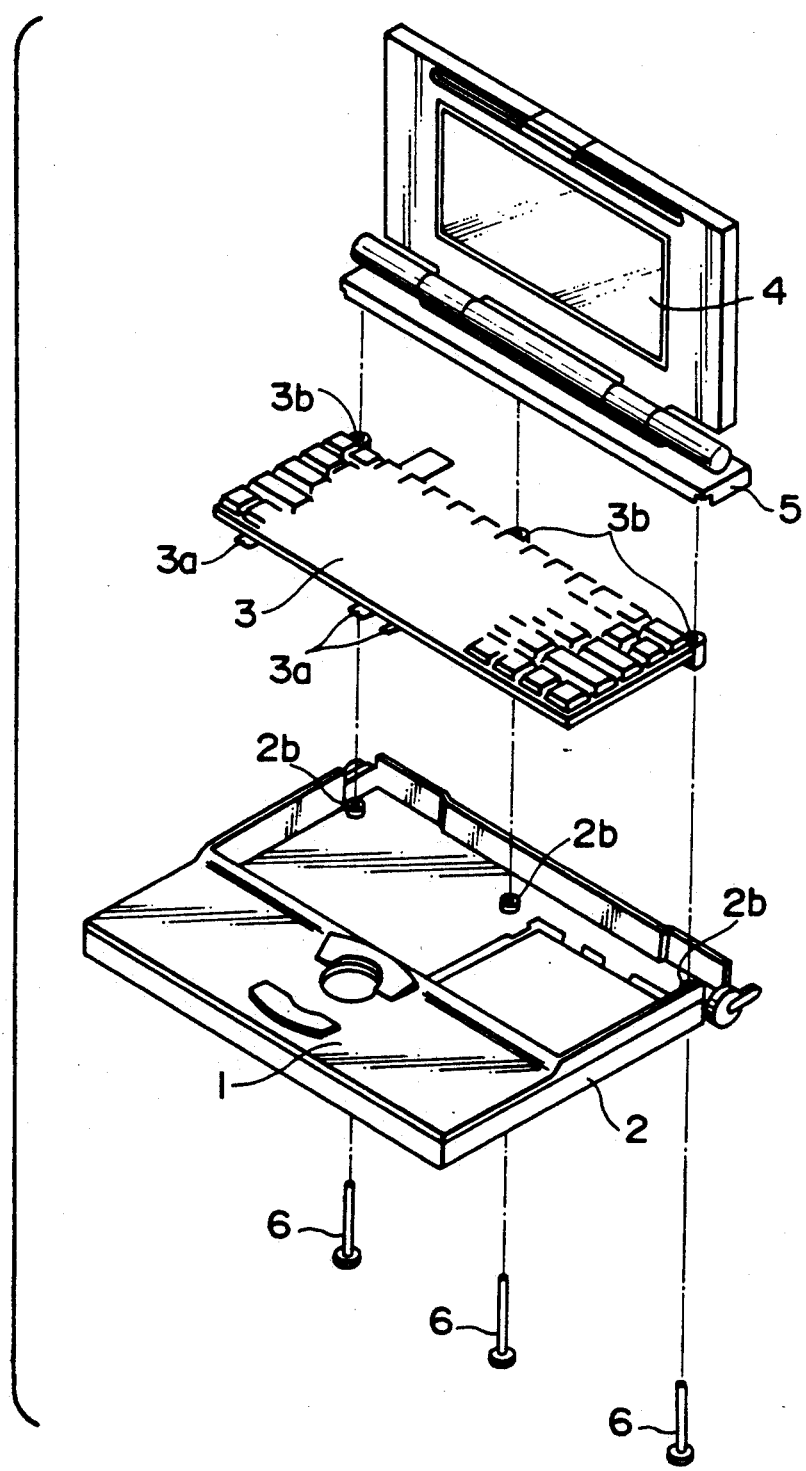
FIG. 1 is a fragmentary perspective view of an information inputting apparatus of the present invention.

An embodiment of the present invention will be described with reference to FIGS. 1 and 2. FIG. 1 is a fragmentary perspective view of an information inputting apparatus of the present invention, and FIG. 2 is an enlarged fragmentary perspective view of essential part of the information inputting apparatus of the present invention.

Figure 2:
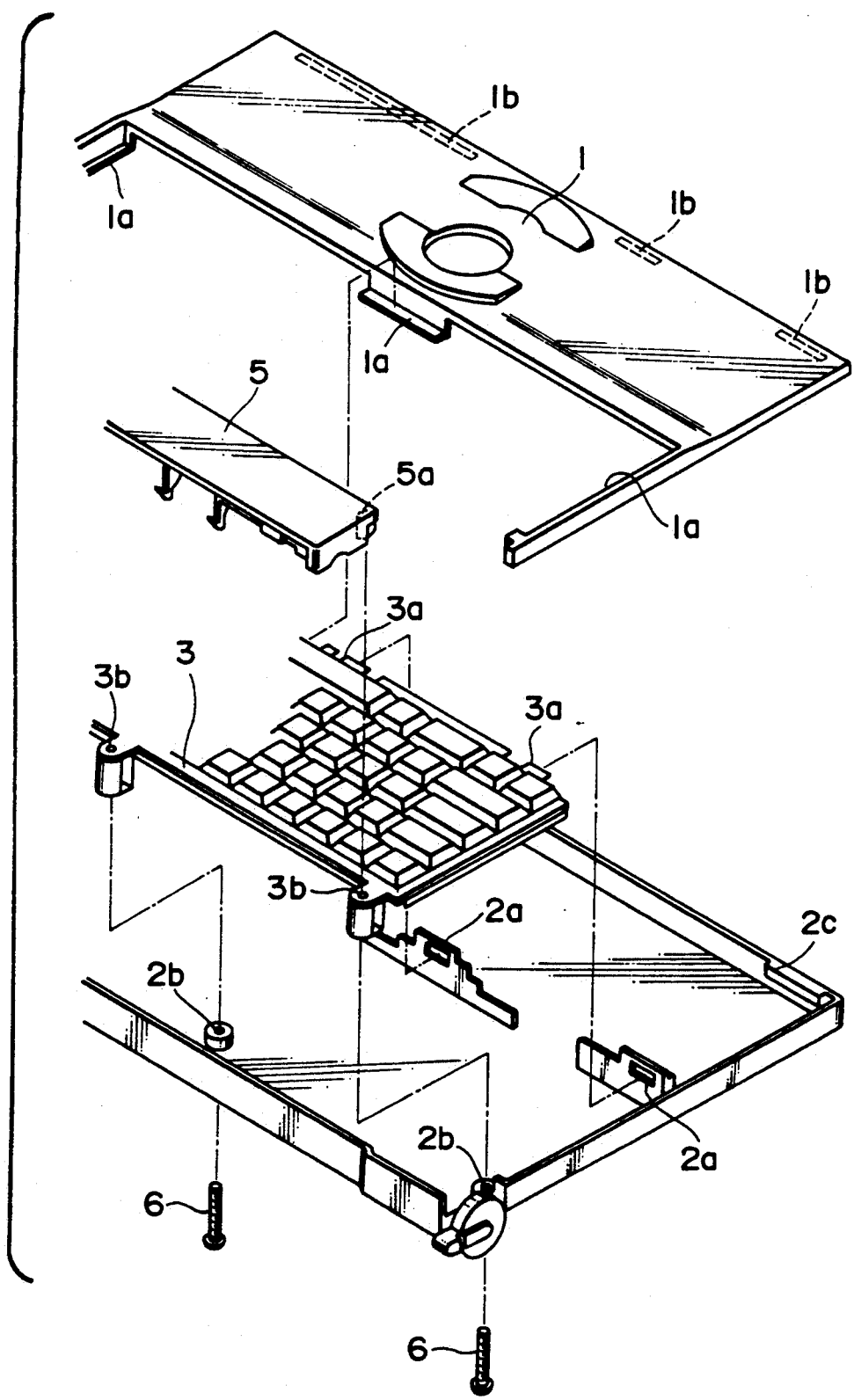
FIG. 2 is an enlarged fragmentary perspective view of essential part of the information inputting apparatus of the present invention.

Referring to FIGS. 1 and 2, the information inputting apparatus of the present invention includes an upper cabinet 1, a lower cabinet 2, a keyboard 3 having a plurality of keys arranged thereon, and a cover 5 on which a liquid crystal display 4 is mounted.

The upper cabinet 1 has, for example, three tab portions 1a arranged thereon for contacting with a lower face of the keyboard 3 to effect positioning and holding of the keyboard 3.

The lower cabinet 2 has fitting holes 2a formed on projected wall portions provided on a lower surface of the lower cabinet for engaging with first fitting projected portions 3a of the keyboard. All of the fitting holes 2a need not be holes, but though not shown, some of them may be fitting recessed portions. Further, the lower cabinet 2 has first projected portions on which first mounting holes 2b on which the keyboard 3 is placed is arranged.

The upper cabinet has first catching portions 1b, and the lower cabinet has second catching portions 2c. The portions 2C are engaged with each other upon later assembling.

The keyboard 3 has the first fitting projected portions 3a disposed at an end thereof for fitting with the fitting holes 2a or fitting recessed portions of the lower cabinet 2. Further, the keyboard 3 has at the other end thereof a second projected portion on which second mounting holes 3a which are held between the lower cabinet 2 and the cover 5 are arranged.

The cover 5 has female screws 5a arranged thereon which are fixed by male screws 6 by way of the first mounting holes 2b of the lower cabinet 2 and the second mounting holes 3a of the keyboard 3.

Subsequently, an assembling procedure will be described.

① in FIG. 3, the lower cabinet 2 is covered by the upper cabinet 1 to place the upper cabinet 1 onto the lower cabinet 2 and first catching portions 1b arranged on a side of the upper cabinet 1 opposite to the tab portions 1a are engaged with the recessed portions of second catching portions 2b arranged on the lower cabinet 2. ② The first fitting projected portions 3a of the keyboard 3 are fitted into the fitting holes or/and fitting recessed portions 2a of the lower cabinet 2. In this instance, the tab portions 1a of the upper cabinet 1 are placed under the keyboard 3 and are fixed. The center tab portion 1a of the upper cabinet is provided at the position where the first fitting projected portions are not provided.

③ The cover 5 is placed onto the lower cabinet 2 between the lower cabinet 2 and an outer edge of the keyboard 3. Then, cutting portions 5b arranged on the cover 5 hold down the projected portions 1c arranged on the upper cabinet 1.

④ Consequently, the first mounting holes 2b of the lower cabinet 2, the second mounting holes 3a of the keyboard 3 and the female screws 5a of the cover 5 are aligned with each other. Thus, the male screws 6 are inserted from below the lower cabinet 2 and then tightened so that the upper cabinet 1, lower cabinet 2, keyboard 3 and cover 5 are fixed relative to one another, thereby completing the assembly of the information inputting apparatus.

Since the information inputting apparatus of the present invention can decrease the number of screws for fixing the upper cabinet to the lower cabinet as described so far, it has the following effects:

① The service feasibility if improved.
② It is also improved in appearance.

WE CLAIM AS OUR INVENTION

1. An information inputting apparatus comprising an upper cabinet, a lower cabinet, a keyboard having a plurality of keys arranged thereon, and a cover,
   said upper cabinet having tab portions provided thereon for contacting with a lower face of said keyboard to effect positioning and holding of said keyboard,
   said lower cabinet having fitting holes and fitting recessed portions for said keyboard and having first mounting holes for placing said keyboard thereon
   said keyboard having fitting projected portions provided at an end thereof for fitting with said fitting holes and fitting recessed portions of said lower cabinet and having second mounting holes provided at the other end thereof and having held between said lower cabinet and said cover, and
   said cover having female screws provided therein into which male screws having fixed by way of said first mounting holes of said lower cabinet and said second mounting holes of said keyboard.

2. An information inputting apparatus according to claim 1, each of said upper cabinet and said lower cabinet has catching portions which engages with each other.

3. An information inputting apparatus according to claim 1, said cover is provided with a display panel rotatably mounted on said cover.

* * * * *